United States Patent

Kaye

[11] Patent Number: 5,119,529
[45] Date of Patent: Jun. 9, 1992

[54] CABLE HOOK

[75] Inventor: Sydney P. Kaye, Delta, Canada

[73] Assignee: Wire Rope Industries Ltd., Pointe-Claire, Canada

[21] Appl. No.: 703,844

[22] Filed: May 21, 1991

[30] Foreign Application Priority Data

Jun. 11, 1990 [CA] Canada ............................ 2018715

[51] Int. Cl.⁵ ............................................. B63B 35/62
[52] U.S. Cl. .................... 24/136 R; 294/102.1; 403/374; 403/409.1; 441/47; 441/50
[58] Field of Search ............ 24/115 M, 136 R, 136 L; 403/374, 409.1, 367, 314; 294/102.1; 441/47, 50, 52, 54

[56] References Cited

U.S. PATENT DOCUMENTS

| | | | |
|---|---|---|---|
| 1,242,063 | 10/1917 | Southland | 24/136 R |
| 1,692,993 | 11/1928 | Lambert | 403/374 |
| 1,806,844 | 5/1931 | Dennis | 24/136 R |
| 2,917,799 | 12/1959 | Meighan | 24/136 R |

FOREIGN PATENT DOCUMENTS 206624 4/1907 Fed. Rep. of Germany ...... 403/314

*Primary Examiner*—James R. Brittain
*Attorney, Agent, or Firm*—Fleit, Jacobson, Cohn, Price, Holman & Stern

[57] ABSTRACT

A cable hook for securing a cable comprises an elongated body member having a longitudinal aperture generally rectangular in cross-section formed therein and provided on one sidewall with two oppositely tapered surfaces, a cable receiving slot formed between an outer surface of the body member and the aperture for laterally inserting a portion of a cable into the aperture against one wall opposed to the tapered sidewall, a second aperture extending through the body member at approximately right angle to the first aperture, first and second wedge members located in the longitudinal aperture and each provided with an inner surface adapted to engage the cable and an outer tapered surface matching one of the tapered surfaces in the longitudinal aperture and adapted to slide thereon, and a third wedge member insertable in the second aperture and having tapered surfaces for driving the first and second wedge members in opposite direction along their associated tapered surfaces for clamping the portion of the cable inserted into the longitudinal aperture of the hook.

3 Claims, 2 Drawing Sheets

CABLE HOOK

This invention relates to a cable hook, and more particularly to a cable hook for use in joining individual bundles of logs in a log raft.

A log raft is normally formed of a plurality of log bundles assembled together, each bundle being made up of several individual logs secured together using conventional wire rope straps and fittings. The bundles are usually assembled in the wood and transported by truck to the water where they are assembled together into a raft. In assembling a raft, several bundles are arranged side by side to form a row and several rows of log bundles are lined up end to end between a head boom stick and a tail boom stick. Wire ropes are used to interconnect the head and tail boom sticks longitudinally and a wire rope known as a swifter line is used to contain the bundles laterally in each row. The swifter lines are secured to the longitudinal lines using conventional cable hooks such as the one disclosed in Canadian Patent No. 1,158,422.

One problem encountered with conventional cable hooks is that they often become loose when the cable is pulled in a direction opposite to the direction that the wedge member of the cable hook is driven, which happens frequently when maneuvering a log raft on a body of water.

It is therefore the object of the present invention to provide a hook having oppositely working wedge members so that pulling on the rope clamped into the hook in either direction will not loosen the hook from the rope.

The hook in accordance with the present invention comprises an elongated body member having a longitudinal aperture therein generally rectangular in cross-section and provided on one sidewall with two oppositely tapered surfaces one at each end thereof, a cable receiving slot formed between an outer surface of the body member and such aperture for laterally inserting a portion of a cable into the aperture against one wall opposed to the tapered sidewall, a second aperture extending through the body member at approximately right angle to the longitudinal aperture, first and second wedge members located in the longitudinal aperture and each provided with an inner surface adapted to engage the cable and an outer tapered surface matching one of the tapered surface in the longitudinal aperture and being slidable thereon, and a third wedge member insertable into the second aperture and having tapered surfaces for driving the first and second wedge members in opposite directions along their associated tapered surfaces to clamp the portion of the cable inserted into the longitudinal aperture of the hook.

The first and second wedge members are preferably provided with a two-level tapered surface with an intermediate step allowing the wedge members to drop onto the cable with far less longitudinal travel.

A groove is preferably formed into one wall of the longitudinal aperture and keys formed into the mating surfaces of the first and second wedge members. The groove is parallel to the tapered surfaces of the first and second wedge members and terminate short of the opposed longitudinal ends of the body member to prevent dropping of the wedge members from the hook.

A pin is preferably provided for locking the third wedge member when driven in final position.

The invention will now be disclosed, by way of example, with reference accompanying drawings in which.

Figure 1:
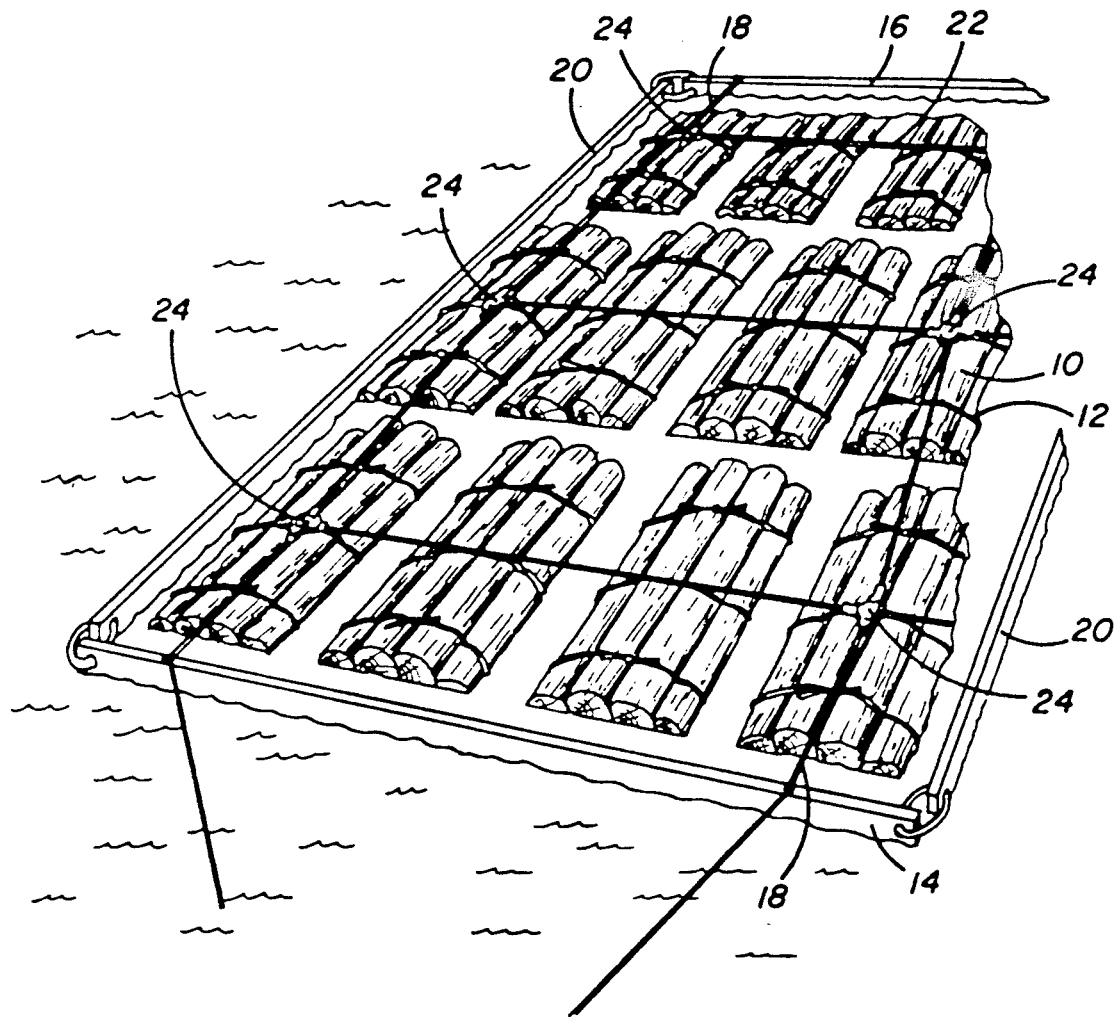
FIG. 1 is a schematic view of a floating log raft employing cable in accordance with the present invention.

Referring to FIG. 1, there is shown a log raft comprising several bundles 10 of logs assembled together by means of encircling wire ropes or straps 12 cinched together by conventional fittings. The bundles are assembled in several rows between a head boom stick 14 and a tail boom stick 16 using longitudinal wire ropes 18 which are threaded under the encircling wire ropes 12 and attached at each end to the boom sticks. The bundles in each row are held together by means of swifter lines 22 which are attached at their extremities to the longitudinal lines 18 using cable hooks 24 made in accordance with the present invention.

Figure 2:
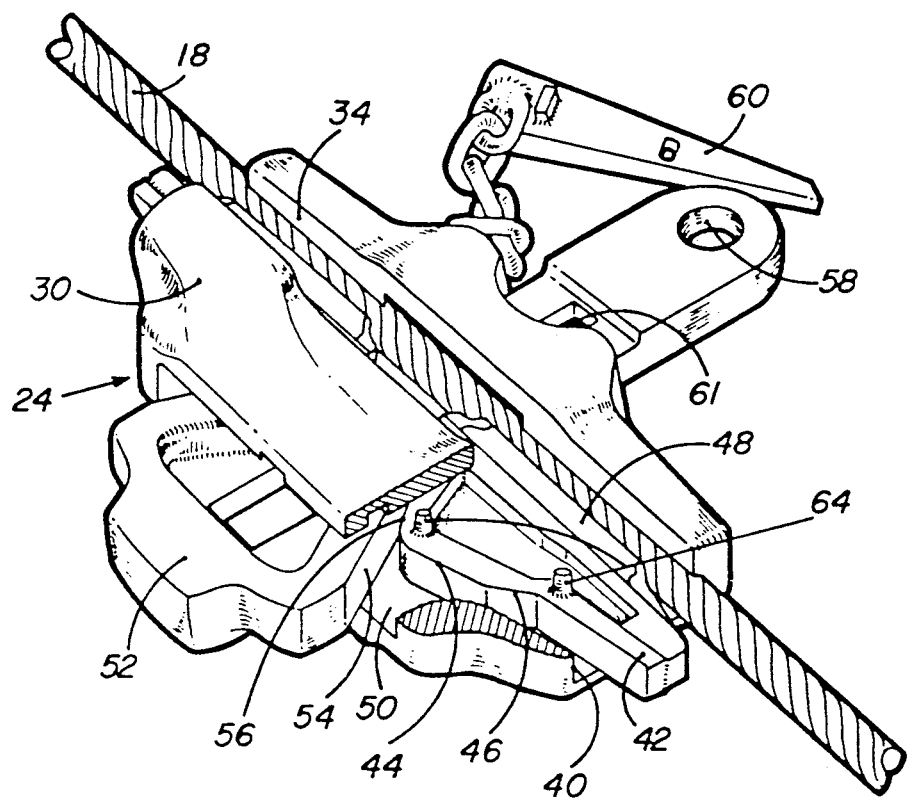
FIG. 2 is a perspective front view of the cable hook in accordance with the present invention with one portion cut away to show one inner wedge members.
Figure 3:
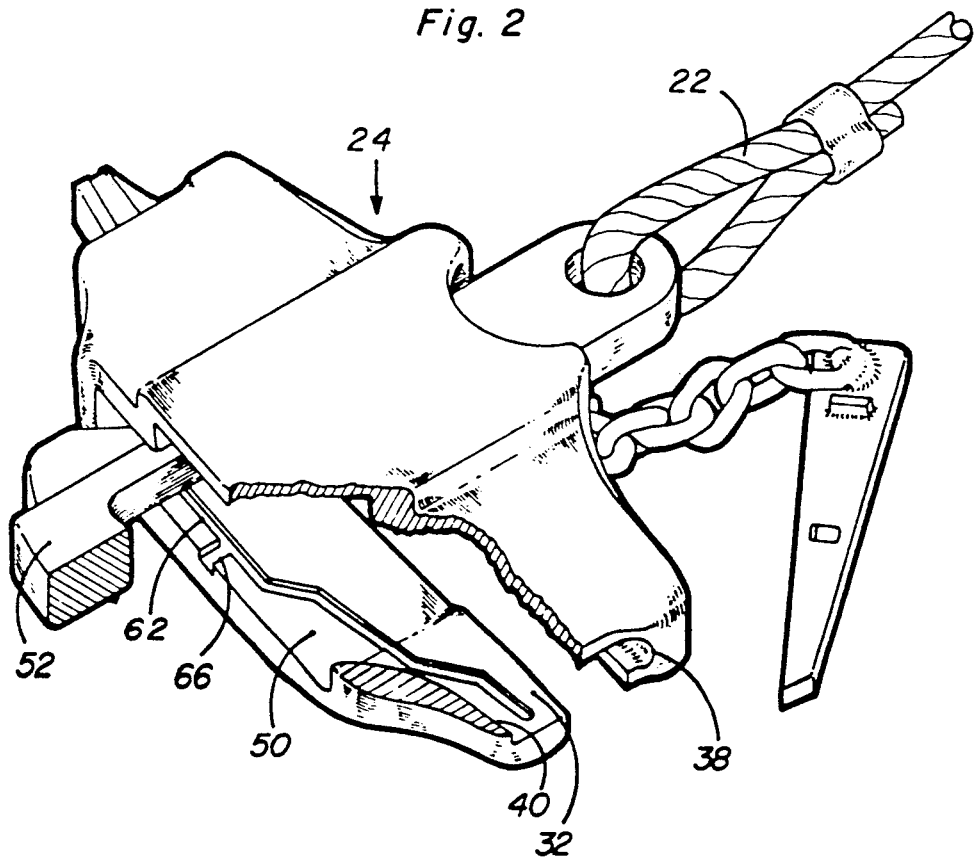
FIG. 3 is a perspective rear view of the cable hook with one portion cut away to show inside grooves for guiding the wedge members.

Referring to FIGS. 2 and 3, the hook comprises an elongated body member 30 having a longitudinal aperture 32 formed therein with a cable receiving slot 34 formed between the outer surface of the body member 30 and the internal aperture for laterally inserting a portion of the cable 18 into the aperture. The aperture is generally rectangular in cross-section and is provided with a cable engaging surface 38 on one wall thereof and two oppositely tapered surfaces 40 on the opposed wall, one at each end of the hook. Two wedge members 42 are mounted one at each end of the aperture. Each wedge member is provided with a two-level tapered surface 44 adapted to engage one of the tapered surfaces 40 of the aperture. A step 46 is provided in the two-level tapered surface 44. This is another feature of the present invention which allows the wedge to drop onto the cable with far less longitudinal travel than current wedge hooks in the field, thus affording a shorter and therefore lighter fixture. A gripper plate 48 made of hardened steel is welded or otherwise secured to the cable engaging surface of the wedge member 42. The gripper plate is preferably provided with teeth to adequately grip the cable.

A second aperture 50 is provided through the body member at approximately 90° from the first aperture. A third wedge member 52 is inserted in the second aperture and is provided with tapered surfaces 54 adapted to engage matching tapered surfaces 56 on wedge members 42 to force the wedge members 42 to slide outwardly and thus clamp the cable 36.

During installation, a hook is attached to each end of a swifter line by passing the end of the swifter line through a hole 58 in the end of the wedge member 52 as shown in FIG. 3 of the drawings. The hooks are attached to a longituidnal wire rope 18 at both extremities of a row of log bundles by inserting the wire rope into the slot 34 of the hooks. The wedge member 52 of each hook is then driven in with a hammer to force the wedge members 42 into engagement with the wire rope to clamp the rope. The other rows of bundles are attached to the longitudinal wire ropes the same way.

The two wedge members 42 provide oppositely acting wedging surfaces generating increased clamping action during pulling of the cable in either direction, thus allowing the log raft to be towed in either direction.

As illustrated in FIG. 2 a pin 60 may be provided for insertion into a slot 61 in wedge member 52 for preventing the wedge from loosening up after it has been driven in position.

It is also desirable to arrange the wedge members 42 within the body 30 so that they will not fall off when the hook is not engaged with a cable and additionally to facilitate the operation of the hook. Therefore, as shown in FIG. 3, a groove 62 is formed into one wall of the aperture 32 and a pair of keys 64 provided on the mating surface of each wedge member 42. Groove 62 parallels the taper of the wedge surface 44 including the step 46 and terminates short of the opposed ends of the body 30. A transverse groove 66 is provided at the centre of the groove to permit insertion and removal of the wedge members 42 into and from the aperture 32., through the second aprture 50.

Although, the invention has been disclosed by way of example, with reference to a preferred embodiment, it is to be understood that it is not limited to such embodiment and that other alternatives are also envisaged within the scope of the following claims.

I claim:

1. A cable hook for securing a cable comprising:
   a) an elongated body member having a longitudinal aperture generally rectangular in cross-section formed therein and provided on one sidewall with two oppositely tapered surfaces;
   b) a cable receiving slot formed between an outer surface of said body member and said aperture for laterally inserting a portion of a cable into said aperture against one wall opposed to the tapered sidewall;
   c) a second aperture extending through said body member at approximately right angle to the first aperture;
   d) first and second wedge members located in said longitudinal aperture and each provided with an inner surface adapted to engage the cable, an outer tapered surface matching one of the tapered surfaces in the longitudinal aperture and adapted to slide thereon, and a multi-level tapered surface with intermediate steps therebetween for allowing the wedge members to drop onto the cable with less longitudinal travel; and
   e) a third wedge member insertable in said second aperture and having tapered surfaces for driving said first and second wedge members in opposite direction along their associated tapered surfaces for clamping the portion of the cable inserted into the longitudinal aperture of the hook.

2. A cable hook as defined in claim 1, wherein a groove is formed into one wall of the longitudinal aperture and keys formed into the mating surface of the first and second wedge members, said groove being parallel to the tapered surfaces of the first and second wedge members and terminating short of the opposed ends of the body member so as to prevent dropping of the wedge members from the hook.

3. A cable hook as defined in claim 1, further comprising a pin for locking said third wedge member when the wedge is driven in position.

* * * * *